United States Patent Office 3,008,517
Patented Nov. 14, 1961

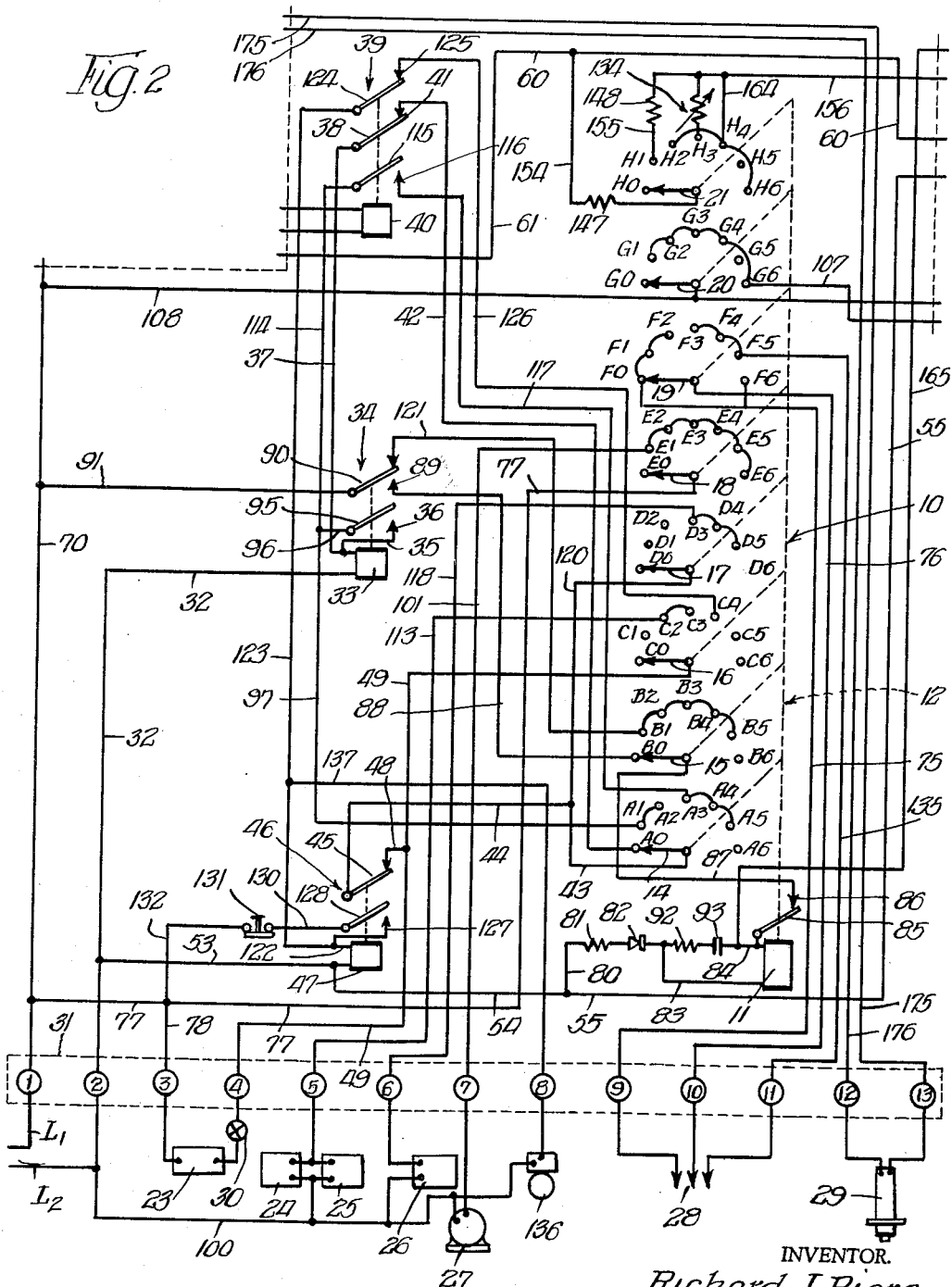

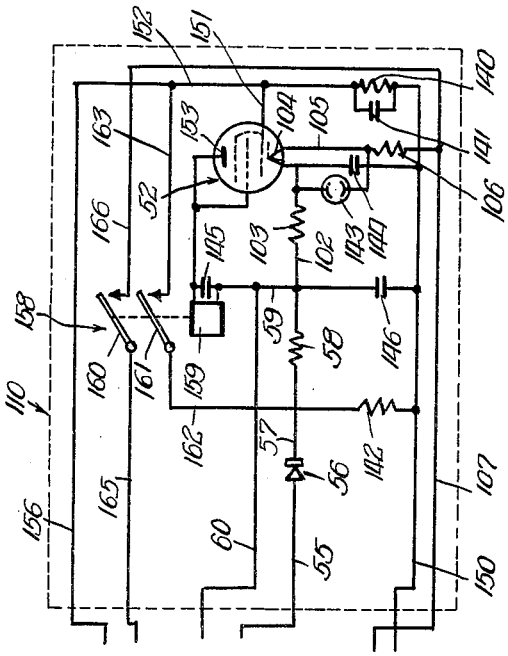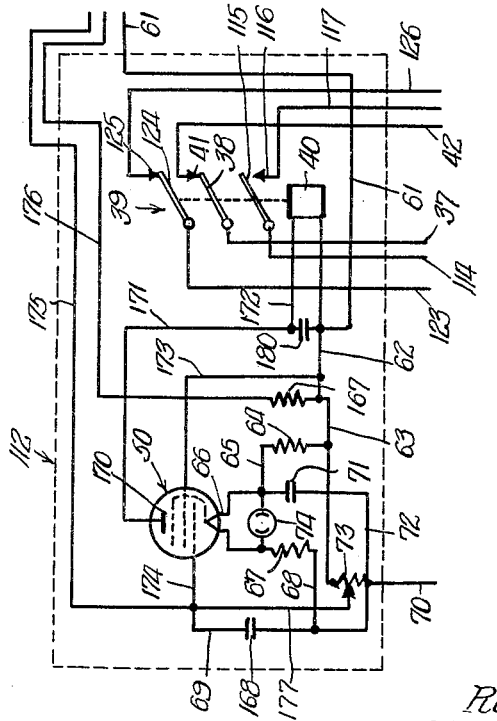

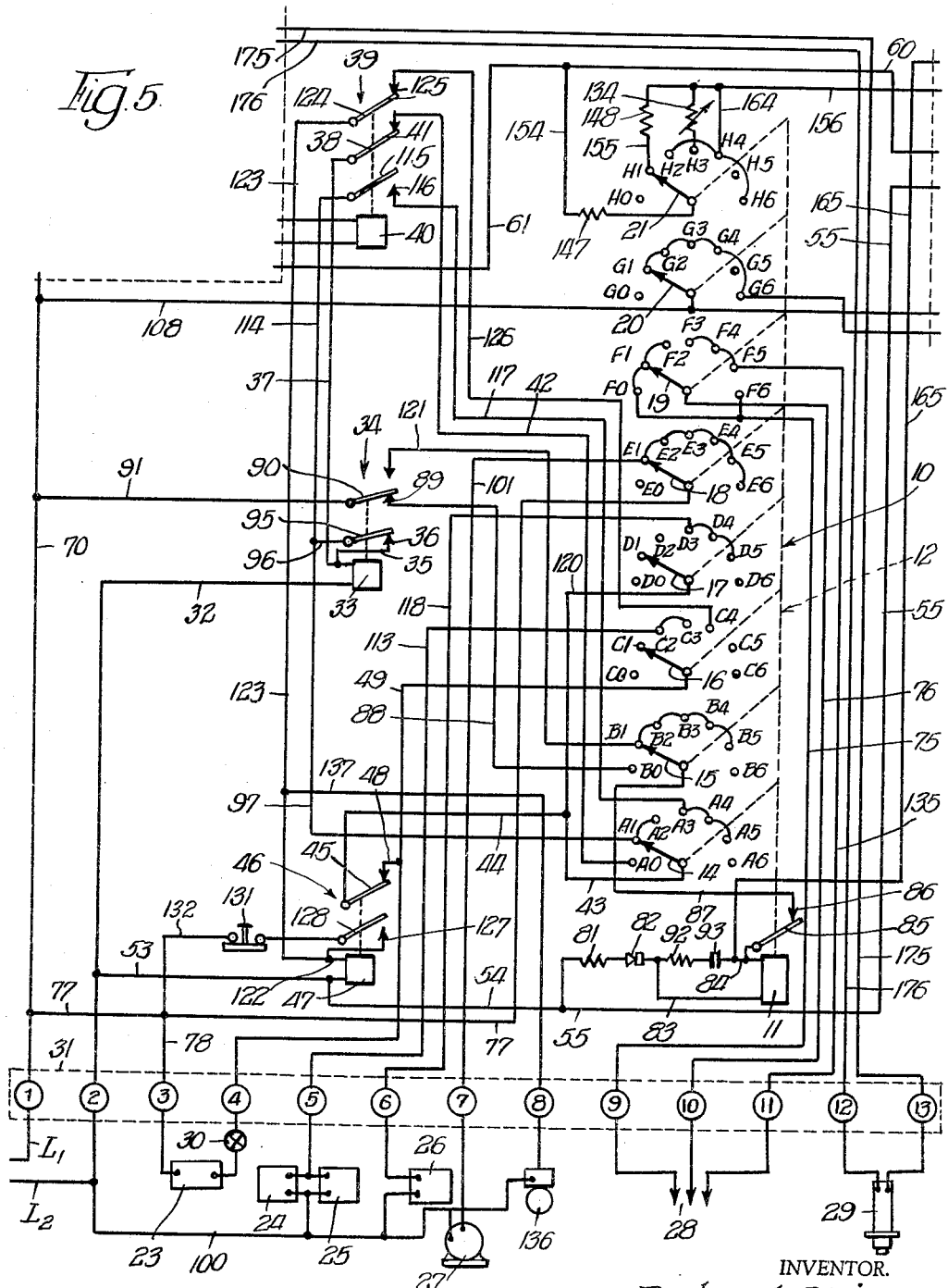

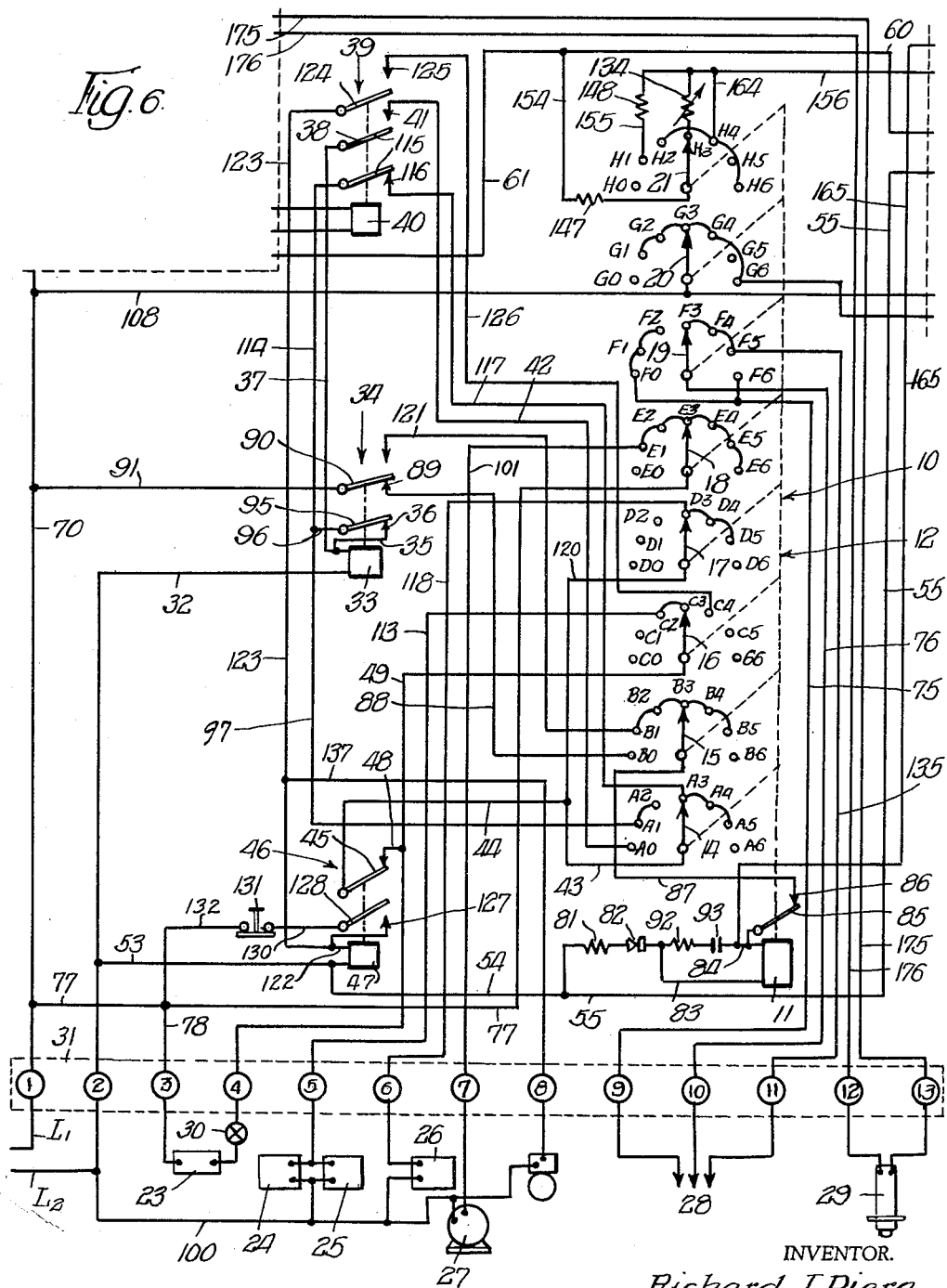

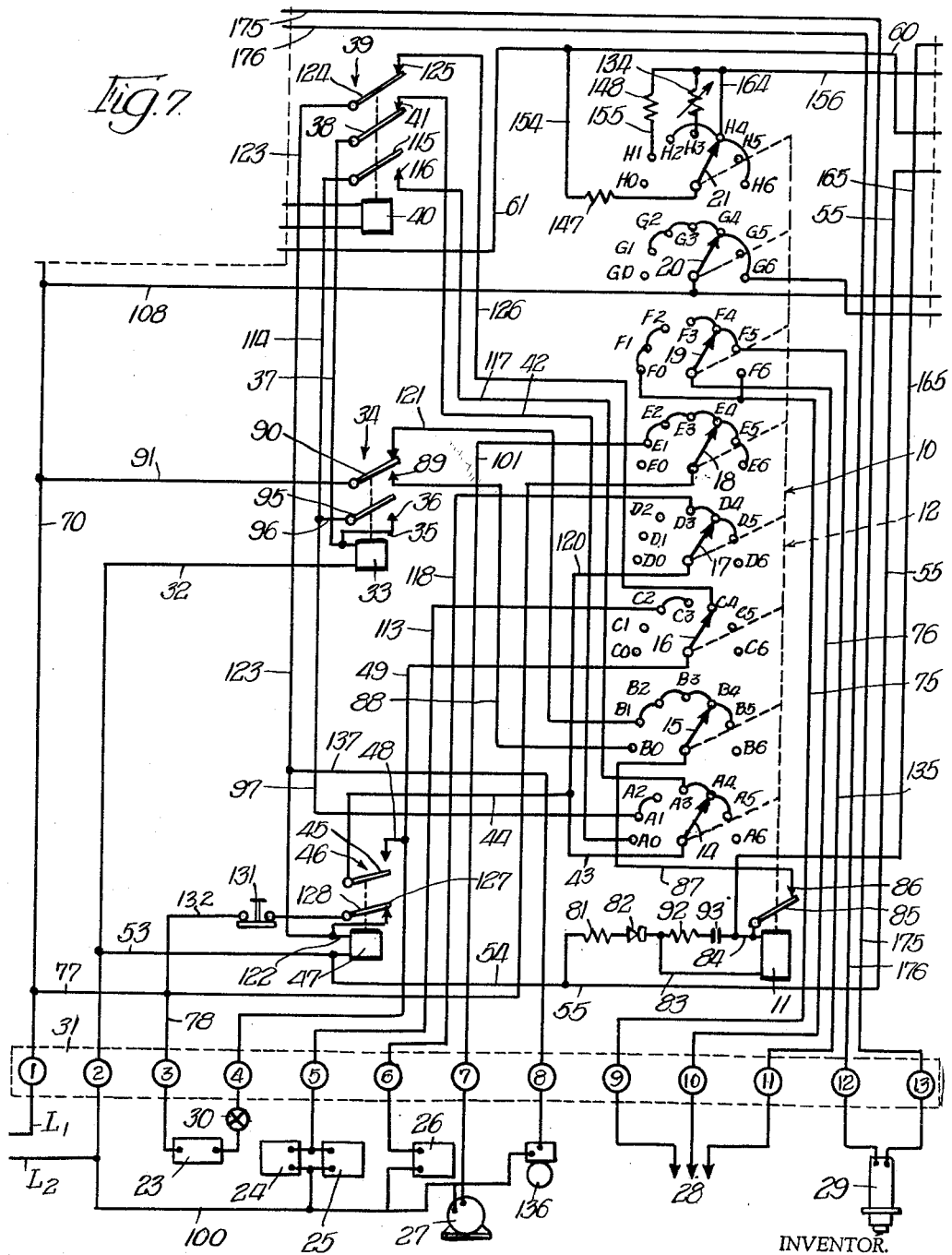

3,008,517
PROGRAMMING AND SEQUENCE CONTROL
FOR FUEL BURNERS
Richard J. Pierz, 8748 Merrill Ave., Chicago, Ill.
Filed June 26, 1957, Ser. No. 668,203
16 Claims. (Cl. 158—123)

The invention relates to control apparatus for fuel burners for industrial and commercial use and has reference in particular to apparatus incorporating an electrically actuated step relay and electronic control circuits for operating a fuel burner in the desired sequence of timed events and with flame detection and lockout for the required safety in the event the fuel at the burner should fail to ignite for various reasons.

A primary object of the invention is to provide programming and sequence control apparatus for automatic fuel burners which will incorporate an electrically actuated step relay in conjunction with an electronic timing circuit, an electronic flame detection circuit and a flame failure lockout circuit all interconnected by novel and improved circuitry for operating a fuel burner in an automatic manner and in proper sequence with respect to the gas pilot valve, ignition transformer, main fuel valve, and the electric motor for the blower and fuel burner.

Another object is to provide programming and sequence control apparatus for automatic fuel burners which will operate electrically to index a step relay for the desired sequencing of the various events, which will include a purge period at the start and end of each complete programming operation, and which will incorporate an electronic timing circuit for timing the several events, thereby eliminating the use of motor driven shafts, cams and electrically heated bi-metal switches for the timing operation.

A further object resides in the provision of a control device as described which will incorporate a flame failure protection circuit employing electronic tubes and which will operate to provide the maximum safety and protection in the event of flame failure even though an electronic tube in the timing circuit or in the flame detector circuit should become defective.

Another object is to provide a control device for controlling a fuel burner through a plurality of events such as an initial purge period, an ignition period, a main flame proving period, a normal burning period, and an off period, and which may include a final purging for a predetermined time interval, wherein electronic circuits of improved design are employed for timing the various events and for providing the required safety and protection in the event of flame failure at the burner, and wherein a step relay performs the sequencing of the several events as permitted by the electronic circuits.

A still further object is to provide a control device for the automatic control of fuel burners and which will operate on alternating or direct current since the device does not employ transformers or synchronous time clocks.

A more specific object of the invention resides in the provision of a programming and sequence control apparatus for operating fuel burners in an automatic manner and which will incorporate a step relay having a plurality of indexed positions for sequencing the various events, the indexing of the step relay taking place as a result of electric impulses supplied thereto. The timing of all the events is controlled by a single electronic timing circuit operating in conjunction with the step relay and which adds resistance to the timing circuit in a selective manner to change the time constants for each timed period.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

FIGURE 2 is a schematic illustration on a larger scale of only the step relay and the electric circuits which have connection with the power source and with the various indexed positions of the relay;

FIGURE 3 is a schematic illustration, on a larger scale than FIGURE 1, of only the electronic timing circuit;

FIGURE 4 is a schematic illustration, on the same scale as FIGURE 3, but showing only the flame detection and lockout circuit;

FIGURE 5 is a schematic illustration similar to FIGURE 2 but showing the step relay in position one;

FIGURE 6 is another schematic illustration showing the step relay in position three and with a flame existing at the burner; and FIGURE 7 is another schematic illustration showing the step relay in position four with the flame failure so that the start and flame detector relays are open and the safety relay is closed to establish the lock out circuit for the apparatus.

Figure 1:
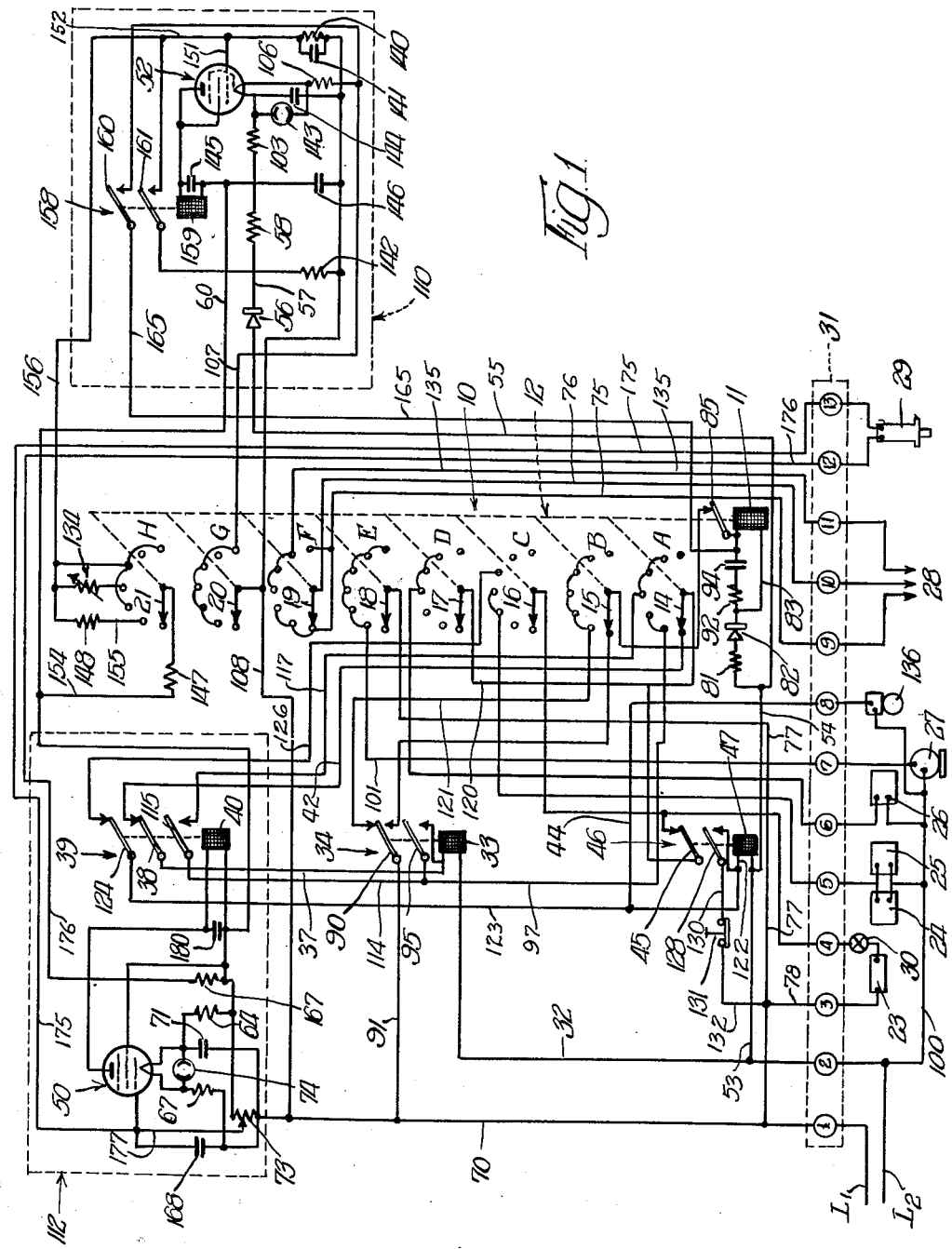
FIGURE 1 is a schematic illustration showing the step relay and the electronic circuits for timing and for flame detection and lockout in electrical connection therewith, all in accordance with the present invention.

Referring to the drawings, the mechanism controlling the sequencing operations comprises a step relay identified in its entirety by numeral 10, the said relay including an electrical coil 11 and mechanical connections such as 12 to the eight rows of stationary contacts identified as A0 to A6; B0 to B6; C0 to C6; D0 to D6; E0 to E6; F0 to F6; G0 to G6; and H0 to H6. The movable switch blades 14, 15, 16, 17, 18, 19, 20 and 21, respectively, for the eight rows of contacts identified by letters A to H having sliding engagement with the contacts. Whenever the coil 11 of the step relay is energized and then deenergized all the moving switch blades from 14 to 21 inclusive move from one position to the next adjacent position in a clockwise direction, as, for example, switch blade 14 will move from A0 to A1; switch blade 15 from B0 to B1, etc. It will be observed that the pivoting end of the movable switch blades each have electrical connection to a certain conductor and likewise that certain of the stationary contacts are also connected by conductors to other elements of the control circuit. Since the step relay works in conjunction with other controls, such as the thermostatic limit switch 23, the gas pilot valve 24, the ignition transformer 25, the main fuel valve 26, the blower motor 27, the auxiliary controls 28, the photoelectric cell 29; and the control switch 30, the present programming and sequence control apparatus will be described in the preferred operational procedure therewith.

*Position zero of the step relay*

For describing the above position of the step relay, it will be assumed that the apparatus is suitably connected to a source of alternating current indicated by conductors $L_1$ and $L_2$, FIGURE 2, and that the limit switch 23 is open so that the room thermostat is not calling for heat. Starting at the terminal strip 31, it will be noted that terminal 2 is connected to conductor $L_2$ of the power supply and that other conductors are connected thereto as follows: conductor 32 connects terminal 2 to the coil 33 of the start relay 34. The other side of this coil is connected by conductor 35 to stationary contact 36, which in a normally open contact. Said other side of the coil is also connected by conductor 37 to the movable switch blade 38 of the relay 39 having coil 40. The movable switch blade 38 engages contact 41, which is connected through conductor 42 to A0 of relay 10. Through the movable switch blade 14 of this relay the connection continues through conductors 43 and 44 to the movable switch blade 45 of the relay 46, having coil 47. Switch blade 45 has contact with terminal 48 connecting with the conductor 49 and which returns to terminal 4 of the strip 31 including the limit switch 30, and which is open at this time. It will thus be seen that the start relay 34 cannot operate until limit switch 30 is closed.

The filament of vacuum tube 50 is energized at this time through conductor 32 leading from terminal 2, conductors 53, 54, 55, rectifier 56, conductor 57, resistor 58, conductors 59, 60, 61, 62, 63, resistor 64 and conductor 65 to one side of filament 66 of said vacuum tube 50. The current flows through the filament and through the bias resistor 67, conductors 68, 69 and 70 to terminal 1 and conductor $L_1$ of the power supply line. There is a condenser 71 in this circuit connected by conductor 72 from the filament 66 to the potentiometer 73. Condenser 71 is used to stop alternating current ripple in the circuit.

The neon tube 74 is connected across filament 66, FIGURE 4, and said tube serves as a visual indicator to indicate the condition of vacuum tube 50. If tube 50 should become defective the neon tube 74 will glow since it will have the entire cathode voltage across it. When tube 50 is not defective, then only the voltage drop across the filament 66 is applied to the neon tube 74 and it will not glow during this period.

The circuit for the auxiliary controls 28 starts with the terminal 9 and includes conductor 75, stationary contact F0, switch blade 19, conductor 76 to terminal 10 of the terminal strip 31. Accordingly, a circuit can be closed on any given device such as may be attached to the fuel burner. It will be observed that this circuit for said auxiliary control is closed during positions F0, F1, F2 and F6 of the step relay 10.

At this time it may be assumed that the limit switch 23 is closed either directly or through any starting device such as may be employed for actuating the switch. A complete circuit will result from terminal 1 through conductors 70, 77, 78 to terminal 3, limit switch 23, the control switch 30, terminal 4, conductors 49, 48 and then through movable switch blade 45 of the safety relay 46. From the movable switch blade the circuit includes conductors 44, 43, movable switch blade 14, contact A0, conductor 42 to contact 41 of the relay 39, and through the movable switch blade 38 thereof to conductor 37, through coil 33 of the start relay 34 and continuing through conductor 32 to terminal 2 and the other side of the line. The circuit is complete and the start relay is caused to operate. With the operation of the start relay 34 the following circuits are completed. From terminal 2 and including conductors 32, 53, 54 and 80 to resistor 81, rectifier 82, conductor 83 to one side of the coil 11 of the step relay 10. The other side of this coil is connected by conductor 84 to the movable switch blade 15. The circuit continues from the stationary contact B0, conductor 88, contact 89 of relay 34 and since the relay is now energized the switch blade 90, conductor 91 to conductor 70 and back to terminal 1 and conductor $L_1$ of the line. Accordingly, the circuit is completed and the coil 11 of the step relay 10 is energized.

The coil 11 of relay 10 is a direct current device and accordingly rectifier 82, FIGURE 2 and the filter network including resistor 92 and condenser 93 are provided to rectify the alternating current and remove any alternating current ripple that may be present across coil 11 of the step relay 10.

*Position one of the step relay*

Upon indexing of the step relay from 0 position to position 1, it will be seen that switch blade 15 will have moved from stationary contact B0 to B1, FIGURE 5, and thus the circuit to the coil 11 of the step relay is broken and the said relay will stay in position 1 until it is stepped to its second position, as will be presently described. A holding circuit for the energized start relay 34 is provided from terminal 2 including conductors 32 through the coil 33 of the said start relay through conductor 35 to stationary contact 36, through movable switch blade 95, conductors 96 and 97 to stationary contact A1, switch blade 14, conductors 43 and 44 to movable switch blade 45 and then by conductors 48 and 49 to terminal 4. It will be observed that terminal 4 is electrically connected through the closed control switch 23, terminal 3, conductors 78 and 77 to conductor 70 and terminal 1, and thus the other side of the power supply line. It will be clearly seen that if the limit switch 23 is opened at any time, the start relay will be deenergized and that the same can not be energized again until step relay 10 completes its cycle and is in its position zero.

The fuel motor circuit is now complete from terminal 2 and includes conductor 100, fuel motor 27, terminal 7, conductor 101, stationary contact E1, switch blade 18, conductors 77 and 70 to terminal 1. It will be noted that E2, E3, E4, E5 and E6 of the step relay 10 are jumpered and accordingly the fuel burner motor will continue to be energized in all positions of the step relay except position E0.

A circuit is also completed for energizing the vacuum tube 52 in the timing section and the same begins at terminal 2 and includes conductors 32, 53, 54, 55, rectifier 56, conductor 57, resistors 58 and 103 to one side of the filament 104. The other side of the filament is connected by conductor 105 to the bias resistor 106, which is in turn connected by conductor 107 to the jumpers on the stationary contacts G6, G4, G3, G2 and G1 of the step relay 10. From the movable switch blade 20 the conductors 108 and 70 connect with terminal 1.

Position 1 of the step relay initiates the first purge or scavenger period and if limit switch 23 is in closed position the timing circuit 110, FIGURE 3, will operate the fuel burner motor 27 for approximately thirty seconds. Then if the limit switch stays closed the timing circuit 110 will advance the steps relay to position 2. Should the limit switch 23 open at this time, the step relay 10 will be immediately indexed to position 6, the time required for this operation consuming approximately one second. During this indexing period no fuel is allowed into the fire chamber of the furnace since the circuits to the fuel valves 24 and 26 have not been energized as yet for actuation of these parts.

Should limit switch 23 or control switch 30 be opened with the step relay in position 1, then the fast indexing of step relay 10 from position 1 to position 6 is accomplished electrically as follows:

First the hold circuit for the start relay 34 is broken since this holding circuit is supplied with electric current from terminal 4. When the relay opens, movable switch blade 90 of the relay will break contact with 89 and a circuit is completed from terminal 1 through conductors 70, 91, switch blade 90, conductor 121, stationary contact B1, movable switch blade 15, conductor 87 to contact 86, movable switch blade 85, and then through coil 11 of the step relay to energize the coil. It will be noted that as the step relay coil 11 is energized the switch blade 85 will move down to break contact 86 and thus the coil is de-energized and movement of the step relay is effected to position 2. In position 2 it will be observed that the jumper from B1 to B2 will again complete the circuit to coil 11 and the same is again broken by the movable switch blade 85. Accordingly, this action continues until the step relay has been indexed to position 6. There is no jumper from B5 to B6 to complete the circuit further.

Assuming once again that the step relay is in position 1, FIGURE 5, and that the limit switch 23 and control switch 30 are closed, then the timing circuit 110 will operate the blower motor 27 for a predetermined time, approximately thirty seconds, and following this operation the step relay will be advanced to position 2. The manner in which the timing circuit steps the relay 10 will be fully explained as the description proceeds.

*Position two of the step relay*

As the step relay is advanced to position 2 the following circuits are completed. The holding circuit for the start relay 34 is the same as previously described except that the jumper A1—A2 is included in the circuit. The circuit for the burner motor 27 is also the same as previously described. The gas pilot valve 24 and the ignition transformer 25 operate because the line is connected directly to one side of the said pilot valve and ignition transformer. The circuit continues through these units since they are connected in parallel to terminal 5 and includes conductor 113, stationary contact C2, movable switch blade 16, and conductor 49 to terminal 4, thus completing the circuit since this terminal has connection with L1 of the power line.

It will further be seen that the gas pilot valve 24 and the ignition transformer 25 will also operate in position 3 of the step relay since stationary contacts C2 and C3 are connected by a jumper. If the gas pilot ignites during this ignition period, then a flame will be present at the nozzle of the gas pilot, the same having location adjacent the main fuel burner. The photoelectric cell 29, which may take the form of a lead sulphide cell, is placed in the furnace so that it can pick up the infra red rays of the gas pilot. Should the cell sense these rays, it will operate the flame detector circuit 112 to accordingly effect operation of the flame detector relay 39 by energizing the relay coil 40 thereof. The structure and mode of operation of this flame detector circuit will be presently described.

*Position three of the step relay*

After approximately ten seconds the timing circuit will advance the step relay from position 2 to position 3. The following circuits are completed with the step relay in position 3, FIGURE 6. The holding circuit for start relay 34 is now from terminal 2 through conductors 32, coil 33 of the relay, conductor 35, stationary contact 36, through movable switch blade 95 since the relay is energized at this time, conductors 96 and 114, movable switch blade 115, stationary contact 116, since relay 39 is also energized, conductor 117, stationary contact A3, switch blade 14, conductors 43, 44, switch blade 45 of the safety relay 46, and through conductors 48 and 49 to terminal 4.

It will now be seen that the holding circuit for start relay 34 can be broken by de-energizing relay 39 or by energizing relay 46, or by breaking the circuit through control switch 30, or by opening the limit switch 23. This holding circuit will remain as described for positions 3, 4 and 5 of the step relay since the jumpers A3—A4 and A4—A5 will complete the circuits in these positions.

The main fuel valve 26 is operated in position 3 of the step relay. The circuit therefore starts at terminal 6 and includes conductor 118, the stationary contacts D3 and the movable switch blade 17, conductors 120, 44, movable switch blade 45, and conductors 48 and 49 to terminal 4. It will be seen that jumpers D3—D4 and D4—D5 will allow the main fuel valve 26 to be operated in positions 3, 4 and 5 of the step relay.

The burner motor 27 and the main fuel valve 26 will both be operated in positions 3, 4 and 5 of the step relay. If there is a failure of combustion of fuel at this point the flame sensing device comprising photoelectric cell 29 will de-energize coil 40 of the relay 39, thus breaking the holding circuit for the start relay 34 and also closing the fuel valves 24 and 26, thereby shutting off all fuel to the burner, although the burner motor and blower 27 will continue to run in order to purge the fire chamber. The step relay will immediately index to position 6 because when the holding circuit of relay 34 is broken a circuit to the coil of the step relay is closed from one side of the line through coil 11 of the step relay, movable switch blade 85, contact 86, conductor 87, movable switch blade 15, stationary contact B3, jumpers B3—B2; B2—B1, conductor 121 to switch blade 90 and through conductors 91 and 70 to terminal 1.

Should a flame failure occur with the step relay in position 3, the said relay will be indexed to position 6, but as it steps past position 4 a circuit is completed for the safety relay 46. This circuit starts at terminal 2 and includes conductors 32, 53, coil 47 of said safety relay, conductors 122, 123 to movable switch blade 124 of relay 39, which is open at this time, since the photoelectric cell has failed to sense a flame in the fire chamber, thus making tube 50 non-conductive and causing the relay to open. From the movable switch blade 124 the circuit includes contact 125, conductor 126, stationary contact C4, switch blade 16, and conductor 49 to terminal 4.

A holding circuit for the safety relay 46 is provided from the coil 47 of the relay through conductors 127, movable switch blade 128, conductor 130, the normally closed spring type switch 131, conductors 132, 77 and 70 to terminal 1. The safety relay 46 can therefore only be de-energized by manual operation of the spring type switch 131.

*Position four of the step relay*

If the flame detecting circuit 112 senses the presence of flame at the fuel burner while the step relay is in position 3, it will stay in said position until the timer circuit 110 indexes the step relay to position 4. This is an undetermined time period and can be set from ten seconds to forty-five seconds by adjustment of the variable resistor 134, FIGURE 6. When the step relay is indexed from position 3 to position 4, the circuit to the gas pilot valves 24 and to the ignition transformer 25 is broken since the movable switch blade 16 moves away from stationary contact C3 onto contact C4 and the fuel burner is then operated from the main fuel valve 26 in conjunction with the fuel burner motor 27. The said fuel burner motor 27 and the holding circuit for start relay 34 are energized during the time the step relay is in position 4. If there is a flame failure in position 4, the unit will go into safety as aforesaid and the same will have to be manually reset with the step relay, however, indexing to position 6. However, in the event the flame detecting circuit 112 senses flame in the fire chamber of the furnace while the step relay is in position 4, the timing unit 110 after approximately ten seconds will effect an indexing operation of the step relay to position 5.

*Position five of the step relay*

Position 5 of the step relay, as best shown in FIGURE 7, is the operating position for the fuel burner and the step relay will remain in this position until the limit switch 23 opens or in the event the control switch 30 is opened. The opening of either switch will break the holding circuit for the start relay 34 and upon this occurrence the relay 33 will become de-energized to release the switch blades 90 and 95 for movement in an upward direction whereby the switch blade 90 breaks contact with terminal 89 and switch blade 95 breaks contact with terminal 36. When switch blade 90 contacts the terminal of conductor 121 it closes a circuit including said conductor, stationary contact B5, switch blade 15, conductor 87, contact 86, switch blade 85 to coil 11 of the step relay. As a result of closing of this circuit and the energization of coil 11 the step relay is immediately indexed to position 6.

In the event the flame detector does not sense the presence of a flame at the fuel burner while the step relay is in running position, that is, position 5, the holding path for the start relay 34 will be broken by the movable switch blade 115 of the relay 39, which moves up to break contact at 116. In other words, relay 39 is de-energized and the switch blades drop out whenever there is a flame failure at the fuel burner. This opening movement of relay 39 will index the step relay to position 6, the same as previously explained. However, the unit does not go into a safety lockout position and no energization of safety relay 46 will occur.

During this operating position of the step relay it can be reiterated that no changes in any of the circuits will appear unless the proper temperature has been reached at the boiler or in the room being heated whereby to satisfy operating conditions as determined by the limit switch 23 or as may be manually determined by actuation of the control switch 30.

In the event the flow of fuel to the burner is curtailed, then the flame detector circuit will take over and relay 39 will drop out as described to index the step relay to position 6. Also, should a break occur in the power supply line, then all the fuel valves will be shut off and when the line current is restored the step relay will start from position 6.

*Position six of the step relay*

When the step relay is indexed to position 6 the circuit to the main fuel valve is immediately broken since switch blade 17 moves away from stationary contact D5. The main fuel valve 26 is immediately closed, thus stopping all flow of fuel to the burner. The fuel burner motor 27 continues to operate, however, for a purge period of approximately ten seconds in order to clear the fire chamber of any accumulated gases. After the ten second period, the timer circuit 110 will step the relay 10 to position 0 and from this position the cycle will start over again when the limit switch 23 is closed or in the event a manual closing of switch 30 should take place.

While the unit remains in position 0, should a flame exist at the fuel burner and even though limit switch 23 or switch 30 may be open or closed, the flame detector circuit 112 will detect the flame through the photoelectric cell 29 and the relay will be energized. As long as relay 39 remains operative by the presence of a flame at the burner, or for some other reason, the step relay 10 can not be moved out of position 0 for the reason that the circuit to the coil 33 of the start relay 34 will be broken by movable switch blade 38 in moving away from contact 41. When the flame detector circuit 112 senses no flame in the fire chamber, then relay 39 will be de-energized and the switch blades will be positioned as shown in FIGURE 1 so that start relay 34 can now be operated.

An auxiliary circuit is formed when the step relay 10 is in positions 3, 4 or 5, the said circuit including terminal 10, conductor 76, switch blade 19, stationary contacts F3, F4 and F5, conductor 135 to terminal 11.

An alarm circuit is also provided as follows: An alarm or indicator, identified by numeral 136, may be connected to terminals 2 and 8 as clearly shown in the drawings. The circuit from terminal 8 includes the conductors 137, 123, 122, 127 and the movable switch blade 128 of the safety relay 46. Whenever the safety relay is energized the circuit is completed through safety switch 131, conductors 132, 77 and 70 to terminal 1 and the other side of the line.

*Timing section circuit*

The timing circuit 110, FIGURE 3, essentially consists of a vacuum tube 52, a time constant circuit consisting of resistor 140, condenser 141, discharge resistor 142, bias resistor 106, neon indicator tube 143, the voltage dropping resistor 103, three filtering condensers 144, 145 and 146, two timing resistors 147 and 148, FIGURE 2, and a variable timing resistor 134.

The said timing circuit has five distinct sections and which can be identified as the filament circuit, the plate circuit, the grid timing circuit, the control circuit for the step relay 10, and the defective tube indicator circuit of which the neon tube 143 is the main component. The position of the step relay is important when describing this timing circuit and the position of said relay will be referred to from time to time as required for the best understanding of the mode of operation of the timing circuit.

The filament circuit includes the vacuum tube 52 having the filament 104 and the circuit for the same starts at terminal 2 and includes conductors 32, 53, 54, 55 to rectifier 56, conductor 57, resistors 58 and 103 to one side of the filament 104. From the other side of the filament the circuit includes the bias resistor 106, conductors 107, stationary contacts G6, G4, G3, G2 and G1, movable switch blade 20, conductors 108 and 70 to terminal 1. It will be noted that the only time the filament circuit of tube 52 is closed is when movable switch blade 20 is in contact with G1, G2, G3, G4 and G6. Filter condenser 144 is connected in parallel circuit relation with the filament 104 and conductor 150 which connecs with switch blade 20 and its purpose is to filter any alternating current ripple from rectifier 56 and which may be present in the filament circuit.

The defective tube indicator 143 is connected across the filament 104. The resistance of the neon tube 143 is high, whereas the resistance of tube 52 is low, and with both said tubes in the same circuit, it will be clearly understood that as long as current flow takes place through filament 104 the neon tube 143 will not glow. However, should the filament 104 break or should 52 become defective, so that current flow no longer takes place through the filament, then the voltage across the neon tube as supplied by rectifier 56 will be sufficient to cause the tube to glow.

When the step relay is in position 1, the filament circuit is complete and tube 52 becomes energized. However, the tube can not conduct since the voltage drop across resistor 106 is impressed upon the control grid 151 of the vacuum tube 52. The circuit includes the conductor 107, the stationary contacts G6, G4, G3, G2 and G1, uovable switch blade 20, conductor 150, grid resistor 140, and conductor 15. The above condition is the same for positions 1, 2, 3, 4 and 6 of the step relay. The bias voltage from resistor 106 will keep the tube 52 from conducting, that is, from passing any current to the timing relay 158, and thus the relay maintains its open position, as shown in the drawings. With the step relay in position 1, the output of the rectifier 56 flows through conductor 57, resistor 58, conductors 59, 60, 154, resistor 147 to the movable switch blade 21, and then through conductor 155, resistor 148, conductors 156 and 152 to the grid resistor 140 and condenser 141. As a result thereof the condenser is charged and when the negative potential on the grid 151, as maintained by the bias resistor 106, becomes a positive potential, the tube 52 conducts and plate current flows through conductor 157 to energize the coil 159 of the timing relay 158. The closing action of the relay operates movable switch blades 160 and 161. As regards switch blade 161 a circuit is completed from conductor 150 through resistor 142, conductor 162, the movable switch blade 161, and conductor 163 to conductor 152, thus discharging the time-constant circuit condenser 141 whereby a negative bias voltage from resistor 106 is again applied to control grid 151, terminating conductivity of the tube 52. A condenser 145 is connected across the terminals of the coil 159 and its purpose is to filter the plate current flowing through the coil 159. In addition said condenser provides a time delay of approximately one second following the non-conductivity of tube 52 before the relay 158 becomes de-energized and returned to its open position. The aforesaid condition repeats itself in positions 2, 3, 4 and 6 of step relay 10, but different times elapse for certain indexed positions because different time-constants are employed, as will now be described.

When movable switch blade 21 is in engagement with stationary contact H1, a time-constant circuit is completed including conductors 60, 154, resistor 147, the movable switch blade 21, conductor 155, resistor 148, and conductors 156 and 152 to the resistor 140 and condenser 141, the same giving a time delay of approximately thirty seconds for indexed position 1 before the tube 52 will be rendered conductive to operate the timing relay 158. When the blade 21 is in contact with stationary contacts H2, H4 and H6, the time-constant circuit includes the resistor 147, conductors 164, 156 and 152 to the resistor 140 and condenser 141 and which gives a time delay of approximately ten seconds for these positions of the step relay. When the movable switch blade 21 is in contact with stationary contact H3 the time-constant circuit includes resistor 147, the variable resistor 134, conductors 156 and 152 to resistor 140 and condenser 141, thereby giving a variable time delay which may be adjusted from ten to forty-five seconds.

It will accordingly be understood that whenever tube 52 conducts it will energize timing relay 158 to cause the switch blades 160 and 161 thereof to close. However, the relay will remain in closed position for approximately one second, as previously stated. At the start of this one second period the movable switch blade 160 will complete a circuit including conductors 165 and 166. It will be seen that conductor 165 is connected to one side of the relay coil 11 which has connection at its other side with terminal 2. Conductor 166 joins with conductor 107 to complete the circuit to terminal 1 and thus the step relay 10 is energized. Following the one second interval the circuit will be broken and the coil 11 of step relay 10 will become de-energized to thereby step the relay 10 to its next position. It will be understood that the timing circuit 110 will operate only when the step relay 10 is in positions 1, 2, 3, 4 and 6.

Vacuum tube 52 is of the pentode type, including a suppressor grid which is internally connected to the center of the filament 104. The screen grid thereof has connection to conductor 157, thus making the pentode tube operate as a triode. The condenser 146, connected in the conductor 59 leading to the coil 159, is for the purpose of filtering the positive pulses from rectifier 56 and thus a more suitable direct current is obtained for energizing the circuits having associated relation with the vacuum tube 52.

*Flame detector circuit*

The circuit for detecting a flame at the fuel burner consists of vacuum tube 50, FIGURE 4, the flame detector relay 39 having the coil 40, the potentiometer 73, the bias resistor 67, the voltage dropping resistor 167, the filter condenser 71, and the time delay condenser 168. The circuit for energizing the filament 66 of tube 50 has been previously described in connection with position 0 of the step relay 10. The plate 170 of the tube 50 is connected through conductors 171 and 172 to the coil 40 of the flame detector relay. The screen grid of said tube 50 is connected through conductor 173 to conductor 62, which is the positive side of the power supply. The suppressor grid is connected to the center of the filament 66 internally of the tube. The control grid 174 is connected by conductor 175 to terminal 13 of the terminal strip 31 and said control grid is also connected by conductor 177 to potentiometer 73. The bias voltage developed across the bias resistor 67 is supplied to the control grid 174 through conductors 68, 69, the potentiometer 73, and then through the center tap conductor thereof 177 to said control grid. Because of this bias voltage the tube 50 is prevented from conducting. However, to make said tube conduct, a positive voltage is taken from conductor 62 through the circuit including resistor 167, conductor 176, to terminal 12, through the photoelectric cell 29, to terminal 13, and back through conductor 175 to the control grid 174. When the photoelectric cell picks up the light produced by a flame at the fuel burner, its resistance decreases, thus overcoming the negative voltage on the control grid produced by the bias resistor 67, and developing a positive voltage on said grid, with the result that the tube 50 is rendered conductive and the plate current energizes the coil 40 of the flame detector relay 39 to operate the switch blades thereof. In the absence of a light source at the fuel burner the photoelectric cell will attain its maximum resistance and as a result the negative potential developed by the bias resistor 67 will again be impressed on the control grid 174 of tube 50. The tube 50 will thereupon become non-conductive and the relay coil 40 will become de-energized, permitting the switch blades of relay 39 to move upwardly into their original position. The potentiometer 73 is provided to permit adjustment so that the maximum sensitivity as regards tube 50 can be obtained. A filter condenser 180 is connected across the terminals of coil 40 for the purpose of filtering small charges of plate current supplied by conductor 171 so that relay 39 will not chatter. Condenser 168 is connected in conductor 69 to provide for a slight time delay before relay 39 will become de-energized following non-conductivity of the tube 50.

The start relay 34, the safety relay 46, the flame detector relay 39, and the timing relay 158 are shown in FIGURES 1, 2, 3 and 4 of the drawings in their open or de-energized position and although this position of said relays is referred to as "open," to distinguish the same from a closed or energized position, nevertheless it will be understood that certain relays will close one or more circuits even when in an open position. Relays 34 and 46 are the only ones having holding circuits in order to maintain their energized position and which is necessary in view of the stepping action of relay 10. In particular, it can be noted that relay 39 functions as a safety circuit in conjunction with the flame detection circuit 112. Upon detecting a flame at the fuel burner the tube 50 will conduct and relay 39 is actuated into a closed position to prevent certain events from taking place and to permit other events to take place, all for the proper programming and sequencing of the burner operations. The relay 46 is energized into a lockout position in position 4 of the step relay in the event flame failure should occur. When once energized the holding circuit for this relay will maintain the same in closed position and release thereof requires manual actuation of the switch 131. Also the alarm circuit is closed upon energization of relay 46 and this indicates to the operator the locked out condition of the control circuits so that he is audibly informed that actuation of the manual switch is necessary.

The seven positions of the step relay may be summarized as follows:

In position zero, or what may be termed the position of rest, the step relay will index to position 1 upon demand of external limit switches such as 23, aquastats, thermostats or other starting controls.

If a flame is detected by the photoelectric cell the step relay will not move from zero position.

In position 1 the blower motor 27 will operate for about thirty seconds to clear fumes from the fire chamber and index to position 2.

In position 2 the gas pilot valve 24 opens and the ignition transformer 25 is energized. If flame is not detected within about ten seconds the step relay will index to position 6. The step relay as it passes position 4 will energize the safety relay 46 and close the alarm circuit.

If a flame is detected by the photoelectric cell the step relay will index to position 3.

In position 3 the main fuel valve 26 is opened and the time period for this position is adjustable through the variable timing resistor from about ten to fifty seconds. At the completion of the time interval the step relay will index to position 4.

At position 4 the ignition transformer is de-energized and the gas pilot valve closes. This position is also the main flame proving period. If a flame is not detected by the photoelectric cell the step relay will index to position 6 and the safety relay will be energized to close the alarm circuit.

Position 4 is timed by the timing circuit and after about ten seconds, assuming that a flame exists at the burner, the step relay will index to position 5.

Position 5 is the normal burning period with the main fuel valve remaining open. However, if the flame should cease to exist the step relay will index to position 6.

Upon satisfaction of the required heat, the limit switches, aquastats or thermostats will open to cause the start relay 34 to open and the step relay will index to position 6.

In position 6 the main fuel valve will close. The blower motor will operate for about ten seconds to clear the fire chamber and then the step relay will index to position zero, thus completing one cycle.

With the step relay in position 1, 2, 3, 4 or 5, should the current fail for any reason, then on restoration of the current the step relay will index to position 6 and this position will remain for the usual purging period and then the step relay will move to position zero and will re-cycle automatically.

The invention is not to be limited to or by details of construction of the particular embodiment thereof illustrated in the drawings, as various other forms of the device will of course be apparent to those skilled in the art without departing from the spirit of the invention or the scope of the claims.

What is claimed is:

1. In control apparatus of the character described, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the said coil, a start relay also having a coil and which must be energized for actuating the start relay into a closed position, switch means, a power circuit including said switch means, the coil of the start relay and a first switch blade of the step relay with said step relay in its normal position of rest and which thereby effects energization of said coil when the switch means are closed, a second power circuit including the coil of the step relay, a switch of said start relay when closed and a second switch blade of the step relay with said step relay in its normal position of rest and which thereby effects energization of said step relay coil when the start relay is closed, whereby to index the step relay one step from its normal position of rest, and a holding circuit for the start relay, said holding circuit including the said switch means and the coil of the start relay and said holding circuit being closed to maintain said coil energized when the start relay is in closed position provided the switch means are closed.

2. In control apparatus of the character described, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the said coil, a start relay also having a coil and which must be energized for actuating the start relay into a closed position, switch means, a flame detector relay including a plurality of movable switch blades and said relay likewise having a coil which must be energized for actuating the switch blades thereof to a closed position, a power circuit including said switch means, a switch blade of the flame detector relay when said relay is open, a switch blade of the step relay with said relay in its normal position of rest and the coil of the start relay and which thereby effects energization of said coil when and which thereby effects energization of said coil when the switch means are closed, a second power circuit including the coil of the step relay, a switch of said start relay when closed and a switch blade of the step relay with said step relay in its normal position of rest and which effects energization of said step relay coil when the start relay is closed, whereby to index the step relay one step from its normal position of rest, and a holding circuit for the start relay, said holding circuit including the said switch means and the coil of the start relay and said holding circuit being closed to maintain said coil energized when the start relay is in closed position provided the switch means are closed.

3. Control apparatus of the character as described in claim 2, additionally including a flame detector circuit in electrical connection with the coil of the flame detector relay and which is operable to energize the said coil to cause the switch blades of the flame detector relay to close when current flows in the flame detector circuit, a photoelectric cell for detecting the presence of a flame, connections between the photoelectric cell and the flame detector circuit for causing current to flow in the circuit when the cell detects the presence of a flame, whereby when the said photoelectric cell detects the presence of a flame the switch blades of the flame detector relay are closed and the start relay unless previously energized can not now be energized.

4. Control apparatus of the character as described in claim 2, wherein the start relay includes a pair of switch blades, one for controlling the second power circuit and the other for controlling the holding circuit, wherein the second power circuit thus includes the said switch blade of the start relay when closed, said second power circuit thus being opened by movement of the switch blades of the start relay to open position, and wherein said second power circuit is automatically opened by the switch blade of the step relay as a result of the indexing of the step relay for the said one step.

5. In control apparatus of the character as described, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the coil, a timing relay having switch means and having a coil which must be energized for closing the switch means, an energizing circuit for the relay coil of the step relay and which circuit includes a switch of said timing relay and is established when the timing relay switch means is closed, a timing circuit having a plurality of parallel paths each including a resistor of different value providing a different time constant in electrical connection with different stationary contacts of the step relay, whereby for different positions of the step relay the said relay will connect into said timing circuit different resistors to thereby control the time interval for said particular positions, electronic circuit means for the coil of the timing relay and which is operable for energizing said coil at the end of each time interval, and other circuit means which are established by a closing of the timing relay for effecting de-energization of the timing relay coil.

6. In control apparatus of the character described, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the coil, a timing relay having a pair of switch blades normally located in open position, a coil for the timing relay and which must be energized for closing the switch blades thereof, an energizing circuit for the coil of the step relay and which circuit is established through one of the timing relay switch blades when closed, a timing circuit having a plurality of parallel paths including different values of resistance and in electrical connection with different stationary contacts of the same switch blade of the step relay, whereby for different positions of the step relay the said relay will connect into said timing circuit different resistors which give different time constants to thereby control the time intervals for said particular positions, an electronic circuit including an electric discharge valve for energizing the coil of the timing relay when conductive, means for rendering said electric discharge valve conductive at the end of each time interval as controlled by the resistors in the timing circuit, and other circuit means operable for rendering the electric discharge valve non-conductive following conduction thereof, said other circuit means being established by closing action of the other switch blade of the timing relay.

7. In control apparatus of the character described, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the said coil, an electronic circuit including an electric discharge valve having a filament, a plate and a control grid, a power circuit for energizing the filament, a timing circuit in electrical connection with the power circuit and having a plurality of parallel paths connected to different stationary contacts and having associated relation with the same switch blade of the step relay, each parallel path having a different value of resistance in circuit therewith to provide different time constants, said timing circuit electrically connecting with the control grid and also including an auxiliary circuit of a grid-resistor and a grid-condenser in parallel, grid biasing means for the electric discharge valve for maintaining the same normally non-conductive, a timing relay having a pair of switch blades, a coil for the timing relay in electrical connection with the plate and which is energized to close the switch blades thereof when the valve is conductive, said step relay in different positions connecting into the timing circuit different resistances and thereby controlling the charging time for the grid-condenser, said grid-condenser when charged nullifying the grid biasing means and rendering the electric discharge valve conductive, an energizing circuit which is established by closing action of one of the switch blades of the timing relay for energizing the coil of the step relay whereby to move the step relay one step, and a shorting circuit which is also established by closing action of one of the switch blades of the timing relay for shorting out the resistances from the timing circuit and which permits the grid-condenser to discharge through the grid-resistor.

8. In sequencing and control apparatus for a fuel burner, in combination, a step relay having a plurality of movable switch blades adapted to have movement simultaneously and to an equal extent, a plurality of stationary contacts for each switch blade and which are positioned for sequential contact thereby, means including a relay coil for indexing the switch blades of the step relay one step for each energization of the coil, an energizing circuit for the said relay coil whereby to effect periodic energization of the coil and indexing of the step relay, a timing circuit having a plurality of parallel paths including different values of resistance and in electrical connection with different stationary contacts of the step relay, whereby for different positions of the step relay the said relay will connect into said timing circuit different time constants to thereby control the time intervals for said particular positions, an electronic circuit including an electric discharge valve in electrical connection with the timing circuit, said electric discharge valve having a cathode, a plate and a control grid, a biasing resistor in the grid-cathode circuit for maintaining the valve normally non-conductive, control means in the plate-cathode circuit for controlling the energizing circuit and which is rendered operative to energize the coil of the step relay when the electric discharge valve is conductive, a grid-condenser in the timing circuit and having electrical connection with the control grid of said valve, whereby said grid-condenser is charged through said resistances and at a rate predetermined by the resistance values thereof to nullify the negative voltage of the biasing resistor and render the valve conductive, and other circuit means which are established by said control means when operative for shorting out the resistances in the said timing circuit and which permits the grid-condenser to discharge, whereby the biasing resistor is again effective to stop conduction of the valve.

9. Sequencing and control apparatus for a fuel burner as described by claim 8, wherein the control means in the plate-cathode circuit of the electric discharge valve comprises the coil of a timing relay having a pair of movable switch blades, one of said switch blades establishing the energizing circuit when the coil of the timing relay is energized to cause the switch blade to close, and the other switch blade establishing the other circuit means when the coil is energized to cause closing action of the switch blade.

10. In sequencing and control apparatus for a fuel burner, in combination, a step relay having a plurality of movable switch blades adapted to have movement simultaneously and to an equal extent, a plurality of stationary contacts for each switch blade and which are positioned for sequential contact thereby, means including a relay coil for indexing the switch blades of the step relay one step following each energization of the coil, a start relay also having a coil and which must be energized for actuating the start relay into a closed position, a holding circuit for the start relay for maintaining the same in closed position, a flame detector relay likewise having a coil which must be energized for actuating the said relay into a closed position, said holding circuit including a switch of the flame detector relay when closed and the switch of the start relay also when closed, whereby the holding circuit will be broken in the event the flame detector relay should open to de-energize the coil of the start relay which will also return to open position, and a power circuit including a switch blade of the step relay when in certain positions and the start relay when open, said power circuit also including the coil of the step relay and which is thus enegized to step the said relay to the next indexed positions in sequence.

11. In sequencing and control apparatus for a fuel burner, in combination, a step relay having a plurality of movable switch blades adapted to have movement simultaneously and to an equal extent, a plurality of stationary contacts for each switch blade and which are positioned for sequential contact thereby, a means including relay coil for indexing the switch blades of the step relay one step following each energization of the coil, a start relay having a pair of movable switch blades and a coil which must be energized to cause the switch blades to close, a flame detector relay also comprising movable switch blades and a coil which must be energized to cause the switch blades to close, a holding circuit for the start relay for maintaining the coil thereof energized and which includes switch blades of both relays when closed, whereby in the event the flame detector relay should open the holding circuit will be broken to de-energize the coil of the start relay which will also return to open position, and a power circuit including a switch blade of the start relay when in open position and a switch blade of the step relay when in certain positions, said power circuit also including the coil of the step relay and which is thus energized to step the said relay to the next indexed positions in sequence.

12. In sequencing and control apparatus for a fuel burner, in combination, a step relay having a plurality of movable switch blades adapted to have movement simultaneously and to an equal extent, a plurality of stationary contacts for each switch blade and which are positioned for sequential contact thereby, means including a relay coil for indexing the switch blades of the step relay one step following each energization of the coil, a start relay having a pair of movable switch blades and a coil which must be energized to cause the switch blades to close, a flame detector relay also comprising movable switch blades and a coil which must be energized to cause the switch blades to close, a safety relay likewise comprising movable switch blades and a coil which must be eenergized to cause the switch blades to close, a holding circuit for the start relay for maintaining the coil thereof energized and which includes a switch blade of both the start and flame detector relays when closed and a switch blade of the safety relay when open, whereby the holding circuit is broken by de-energizing the coil of the flame detector relay or by energizing the coil of the safety relay, a power circuit including a switch blade of the start relay when in open position and a switch blade of the step relay when in certain positions, said power circuit also including the coil of the step relay and which is thus energized to step the said relay to the next position provided the start relay is open, a second power circuit including a switch blade of the flame detector relay when open, a switch blade of the step relay when in said next position and the coil of the safety relay, whereby with the flame detector relay in open position the coil of the safety relay is energized to cause the switch blades thereof to close, and a holding circuit for maintaining the coil of the safety relay energized and which is established by the closing action of one of the switch blades thereof, and a switch in said holding circuit requiring manual actuation in order to open the holding circuit for the safety relay.

13. In sequencing and control apparatus for a fuel burner, the combination with a step relay capable of movement for stepping a plurality of switch blades so that each blade will sequentially engage with a plurality of stationary contacts of said relay, said step relay including a relay coil and means which must be actuated by the coil to effect a step movement of the switch blades, means for energizing said coil to move the switch blades of the step relay from their normal position of rest to a first position and which includes an electric circuit having thermostatic switch means in series relation with a first switch blade of the step relay, a blower motor, a power circuit including said blower motor and which is established by a second switch blade of the step relay when in said first position, a timing circuit for timing the period the step relay remains in said first position, said timing circuit being operable at the end of the period to effect energization of the step relay coil for stepping the said relay from said first position to a second position, a gas pilot valve, an ignition transformer, and a second power circuit for controlling actuation of said gas pilot valve and energization of the ignition transformer, said second power circuit being established by a third switch blade of the step relay when said relay is in a second position, whereby the gas pilot valve is actuated into an open position and the ignition transformer is energized.

14. In sequencing and control apparatus for a fuel burner, the combination with a step relay capable of movement for stepping a plurality of switch blades so that each blade will sequentially engage with a plurality of stationary contacts of said relay, said step relay including a relay coil and means which must be actuated by the coil to effect a step movement of the switch blades, means for energizing said coil to move the switch blades of the step relay from their normal position of rest to a first position and which includes an electric circuit having thermostatic switch means in series relation with a first switch blade of the step relay, a timing circuit in electrical connection with the coil of the step relay and which is operable at the end of respective timed periods to energize the coil whereby to effect an indexing of the step relay from said first position to a second position and then to a third position, a main fuel valve, and a power circuit for controlling actuation of said main fuel valve, said power circuit being established by a second switch blade of the step relay when said relay is in a third position.

15. Sequencing and control apparatus for a fuel burner as defined by claim 14, wherein the means for actuating the step relay coil to move the step relay from a normal position of rest to a first position additionally includes in the electric circuit a start relay having a closed position for energization of said coil, a photoelectric cell for detecting the presence of a flame at the fuel burner, means controlled by the photoelectric call and including a flame detector relay having a closed position when a flame exists at the fuel burner, a holding circuit for maintaining the start relay closed, said holding circuit with the step relay at said third position including the said flame detector relay in closed position, whereby in the event of flame failure the flame detector relay will open to cause the start relay to also open, and a power circuit including the step relay coil and which is established upon opening of the start relay, whereby said step relay coil is energized to move the step relay from said third position and independently of the timing circuit.

16. In control apparatus, in combination, a step relay having a plurality of movable switch blades adapted to have movement simultaneously and to an equal extent so that each switch blade will make contact sequentially with a plurality of stationary contacts of said relay, said step relay including a relay coil and means which is operable by the coil for indexing the switch blades of the step relay one step for each energization of the said coil, a start relay including a pair of switch blades and a coil and which must be energized for actuating the start relay into a closed position, switch means, a power circuit including said switch means, the coil of the start relay and a first switch blade of the step relay with said step relay in its normal position of rest and which thereby effects energization of said start relay coil when the switch means are closed, a second power circuit including the coil of the step relay, a switch blade of the start relay when closed and a second switch blade of the step relay with said step relay in its normal position of rest and which thereby effects energization of said step relay coil when the start relay is closed, whereby to move the switch blades of the step relay one step from their normal position of rest, and a holding circuit including the said switch means, the coil of the start relay, the second switch blade of the start relay when closed and the said first switch blade of the step relay in an indexed position, said holding circuit being closed to maintain said coil energized when the start relay is in closed position provided the switch means are closed.

References Cited in the file of this patent
UNITED STATES PATENTS

| | | |
|---|---|---|
| 1,552,321 | Lea | Sept. 1, 1925 |
| 2,029,542 | Polin | Feb. 4, 1936 |
| 2,337,486 | Miller | Dec. 21, 1943 |
| 2,425,589 | Aubert | Aug. 12, 1947 |
| 2,494,520 | Riggen | Jan. 10, 1950 |
| 2,532,627 | Koci | Dec. 5, 1950 |
| 2,748,845 | Marshall et al. | June 5, 1956 |

UNITED STATES PATENT OFFICE
CERTIFICATION OF CORRECTION

Patent No. 3,008,517                                    November 14, 1961

Richard J. Pierz

It is hereby certified that error appears in the above numbered patent requiring correction and that the said Letters Patent should read as corrected below.

Column 4, line 41, for "steps" read -- step --; column 8, line 13, for "connecs" read -- connects --; line 33, for "uovable" read -- movable --; line 35, for "15" read -- 152 --; column 13, line 12, for "ressitors" read -- resistors --; column 14, line 50, for "enegized" read -- energized --.

Signed and sealed this 10th day of April 1962.

(SEAL)
Attest:

ERNEST W. SWIDER                                    DAVID L. LADD
Attesting Officer                                      Commissioner of Patents